(12) United States Patent
Creamer et al.

(10) Patent No.: US 7,957,271 B2
(45) Date of Patent: Jun. 7, 2011

(54) USING MOBILE TRAFFIC HISTORY TO MINIMIZE TRANSMISSION TIME

(75) Inventors: Thomas Edward Creamer, Boca Raton, FL (US); James C. Fletcher, Apex, NC (US); Curtis E. Hrischuk, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 11/076,154

(22) Filed: Mar. 9, 2005

(65) Prior Publication Data

US 2006/0209842 A1 Sep. 21, 2006

(51) Int. Cl.
*G06F 11/32* (2006.01)
(52) U.S. Cl. ......... 370/229; 370/252; 370/254; 370/412
(58) Field of Classification Search .......... 370/229–235, 370/237, 252, 254, 328–329, 338, 412, 428–429, 370/468, 477; 709/203, 208, 220, 225, 226, 709/229, 232–235
See application file for complete search history.

(56) References Cited

U.S. PATENT DOCUMENTS

| | | | | | |
|---|---|---|---|---|---|
| 5,208,804 | A | * | 5/1993 | Wilson et al. | 370/343 |
| 5,258,979 | A | * | 11/1993 | Oomuro et al. | 370/232 |
| 5,349,580 | A | * | 9/1994 | Hester et al. | 370/461 |
| 5,400,328 | A | | 3/1995 | Burren et al. | |
| 5,519,689 | A | * | 5/1996 | Kim | 370/232 |
| 5,636,212 | A | * | 6/1997 | Ikeda | 370/233 |
| 5,673,253 | A | * | 9/1997 | Shaffer | 370/229 |
| 5,802,106 | A | * | 9/1998 | Packer | 375/225 |
| 5,864,546 | A | | 1/1999 | Campanella | |
| 6,005,852 | A | * | 12/1999 | Kokko et al. | 370/329 |
| 6,016,311 | A | * | 1/2000 | Gilbert et al. | 370/280 |
| 6,016,503 | A | * | 1/2000 | Overby et al. | 718/104 |
| 6,028,862 | A | | 2/2000 | Russell et al. | |
| 6,058,109 | A | * | 5/2000 | Lechleider | 370/352 |
| 6,154,767 | A | * | 11/2000 | Altschuler et al. | 709/203 |
| 6,205,125 | B1 | * | 3/2001 | Proctor et al. | 370/328 |
| 6,208,640 | B1 | * | 3/2001 | Spell et al. | 370/358 |
| 6,212,169 | B1 | * | 4/2001 | Bawa et al. | 370/252 |
| 6,304,551 | B1 | * | 10/2001 | Ramamurthy et al. | 370/232 |
| 6,314,110 | B1 | * | 11/2001 | Chin et al. | 370/468 |
| 6,331,986 | B1 | * | 12/2001 | Mitra et al. | 370/468 |
| 6,388,999 | B1 | * | 5/2002 | Gorsuch et al. | 370/335 |
| 6,631,135 | B1 | * | 10/2003 | Wojcik | 370/395.21 |
| 6,907,042 | B1 | * | 6/2005 | Oguchi | 370/412 |
| 7,215,637 | B1 | * | 5/2007 | Ferguson et al. | 370/230.1 |
| 7,397,765 | B2 | * | 7/2008 | Aimoto et al. | 370/252 |
| 2001/0021197 | A1 | * | 9/2001 | Foore et al. | 370/468 |
| 2002/0093910 | A1 | * | 7/2002 | Yazaki et al. | 370/229 |
| 2002/0114334 | A1 | * | 8/2002 | Yang | 370/395.1 |
| 2002/0141338 | A1 | * | 10/2002 | Burke | 370/229 |
| 2002/0191595 | A1 | * | 12/2002 | Mar et al. | 370/352 |
| 2003/0112784 | A1 | * | 6/2003 | Lohtia et al. | 370/342 |
| 2003/0182439 | A1 | * | 9/2003 | Geshwind | 709/236 |
| 2003/0212793 | A1 | | 11/2003 | Kumar | |
| 2004/0042399 | A1 | | 3/2004 | Bly et al. | |
| 2004/0184444 | A1 | * | 9/2004 | Aimoto et al. | 370/352 |
| 2005/0052992 | A1 | * | 3/2005 | Cloonan et al. | 370/229 |
| 2005/0259689 | A1 | * | 11/2005 | Bestavros et al. | 370/477 |

* cited by examiner

*Primary Examiner* — Aung S Moe
*Assistant Examiner* — Curtis A Alia
(74) *Attorney, Agent, or Firm* — Cuenot, Forsythe & Kim, LLC

(57) ABSTRACT

A method of reducing the time needed for sending data over a communication network. The method can include analyzing bandwidth usage of a user over a communication network and receiving data associated with the user to be sent over the communication network. The method further can include determining, from the bandwidth usage of the user, a probability that additional data will be received within a specified time period and selectively sending the data via the communication network according to the probability.

16 Claims, 2 Drawing Sheets

USING MOBILE TRAFFIC HISTORY TO MINIMIZE TRANSMISSION TIME

BACKGROUND

1. Field of the Invention

The present invention relates to sending data over communication networks and, more particularly, to reducing the time needed for transmitting such data.

2. Description of the Related Art

Modern communication standards are able to carry both voice and data. One such standard is known as CDMA2000, also referred to as 1×RTT. 1×RTT is shorthand for single carrier (1×) radio transmission technology (RTT). 1×RTT is a code division multiple access (CDMA) version of the IMT-2000 standard developed by the International Telecommunication Union (ITU) and is a third-generation (3-G) mobile wireless technology.

1×RTT cellular communication includes a feature whereby increasing amounts of bandwidth are allocated to a user when the user fully utilizes the bandwidth already allocated. For example, if a user is transferring a large file over a mobile channel, the data may be transmitted at an initial rate of 56 Kbps. If the file is large enough such that transmission continues after a short period of time, another 56 Kbps can be allocated to the user, bringing the total to 128 Kbps. If the user continues to utilize the 128 Kbps for a longer period of time, additional bandwidth can be allocated.

One common use of cellular communication networks is the exchange and/or synchronization of information. This is particularly true of personal information management (PIM) data such as electronic mails, calendar information, and the like. PIM data typically is small in size and is sent on a periodic basis. That is, such data largely is sent from time to time and not as a large batch of data, but rather in small increments.

When sending small amounts of data on a periodic basis, increased bandwidth allocation often is not available within mobile networks such as 1×RTT networks. More than likely, sending small portions of data will not exhaust the bandwidth currently allocated to the user. Since increased bandwidth is made available only when a user utilizes the bandwidth currently allocated, no further bandwidth is made available. As a result, the transmission of such data can require more time as the allocated bandwidth remains low.

When data is sent at different times, other inefficiencies of the mobile network, such as start-up delays, can be significant. Start-up delays refer to the time required to initialize a mobile channel. The mobile channel must be initialized prior to each data transmission. The cumulative effect of sending small amounts of data on a periodic basis is that multiple channel initializations must be performed. That is, each time data is sent, the mobile channel must be initialized. This further increases the amount of time required to send data in small amounts.

It would be beneficial to provide a technique for sending small amounts of data over a communications network while taking advantage of the efficiencies provided by selected communication protocols and/or networks.

SUMMARY OF THE INVENTION

The present invention provides a solution for more efficiently sending data over a communication network. One embodiment of the present invention can include a method of reducing the time needed for sending data over a communication network. The method can include analyzing bandwidth usage of a user over the communication network and receiving data associated with the user to be sent over the communication network. The method also can include determining, from the bandwidth usage of the user, a probability that additional data associated with the user will be received within a specified time period. The data can be selectively sent via the communication network according to the probability.

Another embodiment of the present invention can include a system for reducing the amount of time required to send data over a communication network. The system can include a transmit probability function indicating a probability that data associated with a user will be received within a specified time period and a transmission cache for temporarily storing data. The system further can include an agent configured to calculate the probability each time data, associated with the user and intended to be sent over the communication network, is received. The agent can selectively store data in the transmission cache based upon the probability, such that if additional data is received within a specified time period, the additional data can be combined with the data in the transmission cache and sent via the communication network.

Other embodiments of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for minimizing the time needed to communicate small amounts of data over a communication network. In accordance with the inventive arrangements disclosed herein, the bandwidth usage of a user can be analyzed. This analysis can be used to implement optimizations relating to the communication channel. In one embodiment, bandwidth usage over the channel can be increased. In another embodiment, the overhead associated with channel setup or initialization can be reduced.

When data is received from the user, a probability can be determined from the bandwidth usage analysis as to whether additional information is likely to be received from the user for transmission over the communication network in the near future. If so, the data can be stored for a limited time. If additional data is received during this time, it can be combined with any stored data and then transmitted. Increasing the amount of data sent at any given time can cause the communication network to increase the amount of bandwidth that is allocated to the user. Further, by delaying the sending of data for a limited time period so that the data can be sent with additional, subsequently received data, the number of channel initializations can be reduced. Each of the embodiments described, when used independently or in combination, can lead to a reduction in the time required to send data over the communication network.

Figure 1:
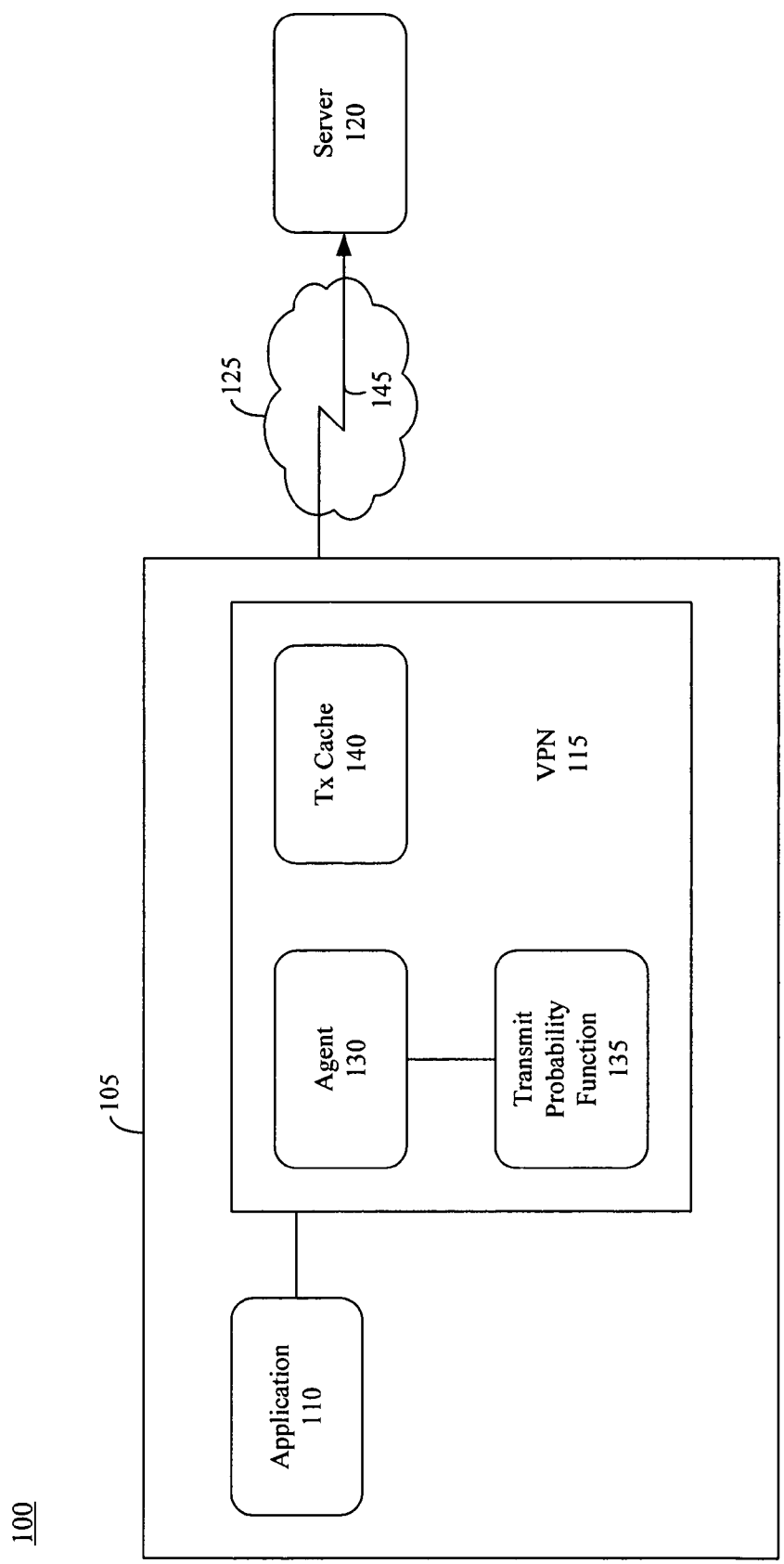
FIG. 1 is a schematic diagram illustrating a system for minimizing the time needed to communicate data over a communication network in accordance with one embodiment of the present invention.

FIG. 1 is a schematic diagram illustrating a system 100 for minimizing the time needed to communicate data over a communication network in accordance with one embodiment of the present invention. As shown, the system 100 can include a client 105, having an application 110, and a virtual private network (VPN) 115. The VPN 115 can send information to, and receive information from, a server 120 via a communication network 125.

The client 105 can be implemented as a computer program executing within a suitable information processing system and/or communication device such as a conventional computer system. The client 105 also can execute within a portable and/or mobile device. For example, in another embodiment, the client 105 can execute within a laptop computer, a mobile phone, or a personal digital assistant configured with communication capabilities.

The application 110 can be any of a variety of different applications, such as an electronic mail program, a calendar program, or the like. In any case, the application 110 can be configured to work in conjunction with the VPN 115 such that users of the application 110 can send information to and receive information from another processing node such as server 120. For example, server 120 can be a personal information management (PIM) server capable of providing electronic mail, scheduling, and other functions which the application 110 can access.

The VPN 115, as is known, can refer to a network in which one or more parts are connected using the public Internet. The data sent across the VPN 115 can be encrypted to ensure that the network is private to some degree, i.e. virtually private. The VPN 115 can encompass suitable software and computer systems for performing various functions including, but not limited to, encryption and decryption of data sent through the VPN 115. In this case, for example, the VPN 115 can refer to those portions, whether software or hardware, of a computing and/or communication device which are necessary for the device to function as part of a VPN.

In accordance with the inventive arrangements, the VPN 115 can include an agent 130, a transmit probability function 135, and a transmission (Tx) cache 140. These components facilitate increased bandwidth allocation being made available from the communication network 125 to users despite the users sending data in amounts that otherwise would not merit such increased bandwidth. In one embodiment, the communication network 125 can be a mobile network configured to function using the 1×RTT protocol.

In another embodiment, the communication network 125 can be another type of mobile network capable of allocating increased bandwidth to users when the user utilizes most or all of the bandwidth currently allocated to that user. The communication network 125 can include transmitters, receivers, base stations, relay stations, and the like (not shown). In any case, the communication network 125 can communicate with the VPN 115 and the server 120 via suitable gateways or other network interfaces.

While the communication network 125 has been described as a mobile network, it should be appreciated that any of a variety of different networks can be used. That is, the communication network 125 can be implemented as a wired or wireless network, a local area network (LAN), a wide area network (WAN), the Internet, or the like. If the network supports "on-demand" type services where bandwidth can be dynamically allocated, then the bandwidth optimizations described herein can be used. If not, then optimizations relating to reducing the number of channel initializations can be implemented. As such, the present invention is not intended to be limited by the particular type of communication network used.

The present invention recognizes that for many activities, user behavior follows a general daily, weekly, monthly, or even yearly schedule. For example, a user may always synchronize electronic mail between 8:15 a.m. and 8:20 a.m. Further, the user typically can receive most incoming electronic mails between 8:10 a.m. and 8:30 a.m. as the user's coworkers arrive at work and begin responding to their electronic mail.

These patterns can be used to temporarily cache data and combine that data with other data to be transmitted over the communication network 125. This can result in more bandwidth being allocated to the transmission by the communication network 125 than would have been allocated to each piece of data if sent individually. Collecting individual transmissions or messages, and sending them at a later time in batch further can reduce the time needed to initialize communication channels. The VPN 115 can monitor and measure this behavior and use the information to minimize time needed to send data over the communication network 125.

Accordingly, the agent 130 can function in two primary modes: a learning mode and an optimized transmit mode. In the learning mode, the agent 130 can analyze the bandwidth usage of one or more users sending data over the communication network 125. During learning mode, data is collected. The agent 130 can correlate the traffic volume to be sent over the communication network 125 from one or more users with absolute time.

The bandwidth usage information can be used to determine the transmit probability function 135. In one embodiment, the transmit probability function 135 can be specified as a histogram or table. In another embodiment, the transmit probability function 135 can be specified as a more sophisticated mathematical function. In either case, the transmit probability function 135 can be refined over time during the learning mode. Notwithstanding the prior description of a learning and transmit mode, it should be appreciated that learning mode can continue while optimized transmit mode is implemented. That is, during operation, data can continue to be analyzed such that the transmit probability function 135, or probabilistic model, is continually refined.

In one embodiment, the transmit probability function 135 can be used to determine or calculate a probability or likelihood that data, associated with a given user and which is to be transmitted over the communication network 125, will be received within a given period of time. In another embodiment, the transmit probability function 135 also can reflect the likelihood of the additional data being of sufficient quantity to merit increased bandwidth allocation from the communication network 125 when combined with previously received and stored data associated with the user.

Thus, when data associated with a given user is transmitted from application 110 to the server 120, it is sent to the VPN 115 for possible encryption and/or compression prior to being sent over the communication network 125. The VPN 115 determines a probability that the user will be transmitting additional data over the communication network 125 within a specified time period. The probability is determined from the transmit probability function. If the probability does not exceed a threshold value, the data can be immediately transmitted over the communication network 125. Communication channel 145 can be initialized and the data can be sent.

If the probability exceeds the threshold value, the data can be temporarily stored in the Tx cache 140. In this case, the VPN 115 expects the user to transmit additional data within a given time period. When additional data associated with the user, and intended to be transmitted via the communication network 125, is received within the time period, the data stored in the Tx cache 140 and the additional data can be combined. The combined data can be sent over channel 145. This can result in more bandwidth being allocated to the transmission as well as reduce the number of initializations needed for channel 145 from two to one. It should be appreciated that a similar operation can be used for the reception of user data from an enterprise, i.e. server 120, and intended for the user.

As an example, the present invention can be used in the context of electronic mail. The application 110 can be an electronic mail application that sends and receives electronic mails. In operation, as many people arrive at work, receive their electronic mails, and then respond within a short time period (e.g. 10 minutes), the present invention can be used to cache data for approximately 10 minutes. After the ten minute time period, the data can be sent to the server as a bulk send.

In another example, the application 110 can be a PDA database application for entering an order for a customer. A user may fill in several Web pages of information, which can be cached and sent at one time. Alternatively, the information can be sent to the enterprise database every 2 hours using a timer. The application 110 may even be a game that is played by thousands of users simultaneously. The present invention can be applied to any of a variety of different applications where a user performs repeated actions or activities such that a probabilistic model can be used to predict such actions.

Figure 2:
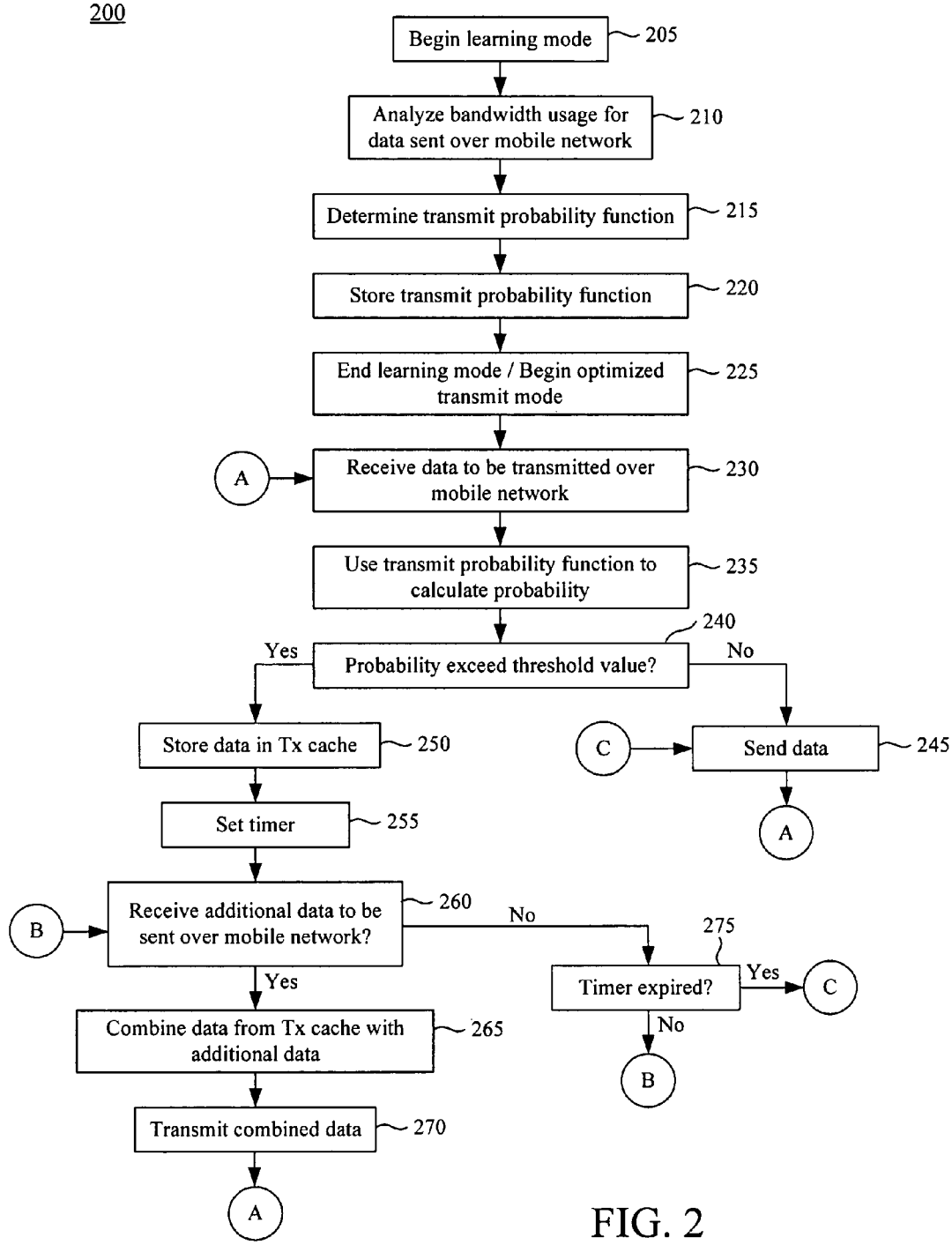
FIG. 2 is a flow chart illustrating a method of reducing the time needed for sending data over a communication network in accordance with the inventive arrangements disclosed herein.

FIG. 2 is a flow chart illustrating a method 200 of reducing the time needed for sending data over a communication network in accordance with the inventive arrangements disclosed herein. The method 200 can be performed by a system such as the one described with reference to FIG. 1. Accordingly, the method 200 can begin in step 205, where the learning mode is started. In step 210, the agent within the VPN can begin monitoring data transmitted by client applications for one or more different users. As noted, the agent can monitor traffic patterns over the communication network for users and record relevant information pertaining to transmissions and/or messages on a per user basis. The information further can be recorded and/or processed on a per application basis. The information that can be recorded can include, but is not limited to, the number of bytes transmitted, the time the transmission was initiated, including the time of day, the weekday, date, year, and the like. Data collection in the learning mode can continue over a period of time such as a day, week, month, etc.

In step 215, after data has been collected, the agent can construct a transmit probability function. The transmit probability function can be user specific, or at least take into account user specific information to yield a user specific probability. In any case, the transmit probability function can be created or refined over time throughout the learning mode. As noted, the transmit probability function, which can be a histogram or a mathematical function, can yield an estimate of the probability that a particular or given user will be transmitting data over a communication network within a specified time period. For example, the transmit probability function can provide an estimate of the probability that a particular user will be transmitting data over the communication network in the next minute, five minutes, ten minutes, hour, etc. In step 220, the transmit probability function can be stored for later use, i.e. during the optimized transmit mode.

In step 225, the learning mode can end and the optimized transmit mode can begin. In step 230, the VPN can receive data from a user or user application that is to be sent over the communication network. In step 235, the agent can access the transmit probability function to calculate or determine a probability that the user will be sending additional information within the specified time period, such as in the next five or ten minutes.

While the transmit probability function can determine a probability that data will be received from the user within a given period of time, the present invention is not so limited. As noted, the transmit probability function further can provide an estimate of the size of any expected data. Accordingly, the transmit probability function can be used to provide an estimate as to whether any additional data associated with the user that is to be transmitted over the communication network would be of sufficient quantity, when combined with any data stored in the Tx cache, to cause the communication network to allocate a next higher amount of bandwidth to the user's transmission.

A determination can be made in step 240 as to whether the probability exceeds a threshold value. If so, the method can proceed to step 250. If not, the method can proceed to step 245. Continuing with step 245, where it has been determined that there is a low probability that the user will be sending additional data within the specified time period, the data can be transmitted. The data can be transmitted without delay, save for any encryption and/or compression that typically is performed by the VPN prior to sending the data. After step 245, the method can loop back to step 230 to repeat as may be required.

In step 250, in the case where it has been determined that there is a high probability that additional data, associated with the user and intended for transmission over the communication network, will be received, the data can be stored in the Tx cache. Data can be temporarily stored in the Tx cache so that the data potentially can be combined with other data. The data is not sent immediately, but delayed for a limited amount of time.

In step 255, a timer can be set. In one embodiment, the timer can be set to the amount of time for which the probability has determined the likelihood of receiving additional data. For example, if the transmit probability function determines the likelihood of receiving data from a user in the next five minutes, the timer can be set to five minutes. In another embodiment, however, the value to which the timer is set need not correspond to, or be the same as, the amount of time for which the probability is determined.

In step 260, a determination can be made as to whether additional data associated with the user and intended to be sent over the communication network has been received. Such data, for example, can originate from the user or the user's account. If so, the method can proceed to step 265. If not, the method can proceed to step 275. In step 275, where no additional data has been received, a determination can be made as to whether the timer has expired. If so, the method can continue to step 245 to send the data and repeat as noted. If not, the method can loop back to step 260 to continue processing. Thus, if the timer expires without the agent receiving further data associated with the user and intended for transmission over the communication network, the data stored in the Tx cache can be sent without combining the data with other data.

In step 265, in the case where additional data associated with the user and to be sent over the communication network has been received, the newly received data can be combined with the data stored in the Tx cache. In step 270, the combined data can be transmitted. By combining data as described, the present invention can achieve two goals. First, the combination of data may be large enough to cause the communication network to allocate a larger amount of bandwidth to the transmission than otherwise would have been allocated had each portion of data been sent individually. Second, the channel over which the data is sent need only be initialized one time rather than two. After the data is transmitted, the method can proceed to step 230 to continue processing.

While the present invention has been described from the perspective of a user sending data to a server, it should be appreciated that the present invention is not so limited. That is, one or more aspects of the present invention also can be applied from the opposite perspective of the server sending information to the client. In that case, the agent and probability functions can reside in the server. Still, such functions can be performed on a user specific and/or application specific basis.

The present invention provides a solution for reducing the amount of time required to send information over a communication network. In accordance with the present invention, each time data is to be transmitted over the communication network, a VPN can evaluate a transmit probability function. The transmit probability function determine the likelihood of receiving, within a predetermined time period, data from the same user that is to be transmitted over the communication network. The value of the transmit probability function can determine whether the data should be cached temporarily or transmitted.

If the probability indicates a high likelihood that further data from the same user that is intended to be transmitted over the communication network will be received, the data can be cached. Otherwise the data is sent. Cached data can be maintained for a limited time before sending whether or not additional data is received. If additional data is received within the defined time period, however, the newly received data can be combined with the cached data such that the combined data is transmitted to take advantage of communication network efficiencies described herein.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of reducing the time needed for sending data over a communication network comprising:
   analyzing bandwidth usage of a user over the communication network;
   receiving data associated with the user to be sent over the communication network;
   determining, from the bandwidth usage of the user, a probability that additional data associated with the user will be received within a specified time period in the future; and
   selectively sending the data via the communication network according to the probability comprising:
      responsive to determining that the probability does not exceed a threshold, indicating a low likelihood of receiving the additional data within the specified time period, sending the data; and
      responsive to determining that the probability does exceed the threshold, indicating a high likelihood of receiving the additional data within the specified time period, delaying the transmission of the data and subsequently sending the data in combination with the additional data received within the specified time period necessitating increased usage of bandwidth of the communication network on behalf of the user.

2. The method of claim 1, wherein the probability exceeds the threshold, said step of selectively sending the data further comprising storing the data temporarily in a transmission cache.

3. The method of claim 2, further comprising:
   determining whether the additional data associated with the user to be sent over the communication network has been received within the specified time period;
   if so, combining the additional data with the data stored in the transmission cache when the additional data is received, prior to the expiration of the specified time period, and sending the combined data using one channel initialization; and
   if not, sending the data in the transmission cache at the end of the specified time period.

4. The method of claim 1, wherein the probability further indicates a likelihood that an amount of the additional data will, when combined with the data, be sufficient to cause a next higher level of bandwidth to be allocated by the communication network for sending the data and the additional data.

5. The method of claim 1, wherein the probability indicates the likelihood of receiving the additional data associated with the user within a different specified time period.

6. The method of claim 1, wherein the probability that the additional data will be received within the specified time period exceeds the threshold, the method further comprising:
   storing the data while transmission of the data is delayed;
   responsive to receiving the additional data within the specified time period, combining the data with the additional data and sending the data and the additional data in combination using one channel initialization; and
   responsive to expiration of the specified time period without having received the additional data, sending the data.

7. A system for reducing the amount of time required to send data over a communication network comprising:
   a computer executing computer-usable program code that causes the computer to:
   analyze bandwidth usage of a user over the communication network;
   receive data associated with the user to be sent over the communication network;

determine, from the bandwidth usage of the user, a probability that additional data associated with the user will be received within a specified time period in the future; and selectively send the data via the communication network according to the probability comprising:

responsive to determining that the probability does not exceed a threshold, indicating a low likelihood of receiving the additional data within the specified time period, send the data; and responsive to determining that the probability does exceed the threshold, indicating a high likelihood of receiving the additional data within the specified time period, delay the transmission of the data and subsequently send the data in combination with the additional data received within the specified time period necessitating increased usage of bandwidth of the communication network on behalf of the user.

8. The system of claim 7, wherein the probability further indicates a likelihood that an amount of the additional data will, when combined with the data, be sufficient to cause a next higher level of bandwidth to be allocated by the communication network for sending the data and the additional data.

9. The system of claim 7, wherein the computer sends the data and the additional data in combination using one channel initialization.

10. The system of claim 7, wherein the computer analyzes the bandwidth usage of the user and determines the transmit probability function.

11. A non-transitory computer-readable storage, having stored thereon a computer program having a plurality of code sections executable by a computer that, when executed, causes the computer to perform the steps of:

analyzing bandwidth usage of a user over the communication network;

receiving data associated with the user to be sent over the communication network;

determining, from the bandwidth usage of the user, a probability that additional data associated with the user will be received within a specified time period in the future; and selectively sending the data via the communication network according to the probability comprising:

responsive to determining that the probability does not exceed a threshold, indicating a low likelihood of receiving the additional data within the specified time period, sending the data; and responsive to determining that the probability does exceed the threshold, indicating a high likelihood of receiving the additional data within the specified time period, delaying the transmission of the data and sending the data in combination with the additional data received within the specified time period necessitating greater bandwidth usage of the communication network on behalf of the user.

12. The non-transitory computer-readable storage of claim 11, wherein the probability exceeds the threshold, said step of selectively sending the data further comprising storing the data temporarily in a transmission cache.

13. The non-transitory computer-readable storage of claim 11, further causing the computer to perform the steps of:

determining whether the additional data associated with the user to be sent over the communication network has been received within the specified time period;

if so, combining the additional data with the data stored in the transmission cache when the additional data is received, prior to the expiration of the specified time period, and sending the combined data using one channel initialization; and if not, sending the data in the transmission cache at the end of the specified time period.

14. The non-transitory computer-readable storage of claim 11, wherein the probability further indicates a likelihood that an amount of the additional data will, when combined with the data, be sufficient to cause a next higher level of bandwidth to be allocated by the communication network for sending the data and the additional data.

15. The non-transitory computer-readable storage of claim 11, wherein the probability indicates the likelihood of receiving the additional data associated with the user within a different specified time period.

16. The non-transitory computer-readable storage of claim 11, wherein the probability that the additional data will be received within the specified time period exceeds the threshold, the computer-readable storage further causing the computer to perform the steps of:

storing the data while transmission of the data is delayed;

responsive to receiving the additional data within the specified time period, combining the data with the additional data and sending the data and the additional data in combination using one channel initialization; and responsive to expiration of the specified time period without having received the additional data, sending the data.

* * * * *